United States Patent
Koeberl et al.

(10) Patent No.: US 6,753,820 B2
(45) Date of Patent: Jun. 22, 2004

(54) COMMUNICATION STATION COMPRISING A CONFIGURATION OF LOOSELY COUPLED ANTENNAS

(75) Inventors: Helmut Koeberl, Graz (AT); Peter Raggam, St.Stefan im Rosental (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/198,811

(22) Filed: Jul. 19, 2002

(65) Prior Publication Data

US 2003/0025640 A1 Feb. 6, 2003

(30) Foreign Application Priority Data

Jul. 31, 2001 (EP) .............................. 01890220

(51) Int. Cl.[7] .............................................. H01Q 21/00
(52) U.S. Cl. ...................... 343/728; 343/855; 343/866; 343/893
(58) Field of Search .................. 343/728, 732, 343/793, 850, 853, 855, 866, 893, 900, 867

(56) References Cited

U.S. PATENT DOCUMENTS

| 4,313,119 | A | * | 1/1982 | Garay et al. ................. 343/702 |
| 4,396,920 | A | * | 8/1983 | Grimberg et al. ........... 343/846 |
| 4,866,455 | A | | 9/1989 | Lichtblau .................... 343/742 |
| 5,289,198 | A | * | 2/1994 | Altshuler .................... 343/729 |
| 5,572,226 | A | | 11/1996 | Tuttle ......................... 343/726 |
| 6,166,706 | A | | 12/2000 | Gallagher, III et al. ..... 343/867 |
| 6,317,091 | B1 | * | 11/2001 | Oppelt ........................ 343/742 |

FOREIGN PATENT DOCUMENTS

| EP | 0766200 A2 | 9/1996 | ......... G06K/19/077 |
| GB | 2245428 A | 6/1990 | .......... H01Q/21/29 |
| WO | WO0229929 | 10/2001 | .......... H01Q/21/28 |

* cited by examiner

Primary Examiner—Wilson Lee
Assistant Examiner—Thuy Vinh Tran
(74) Attorney, Agent, or Firm—Kevin Simons

(57) ABSTRACT

A communication station for contactless communication with suitably formed data carriers has an antenna configuration which has at least one antenna with at least one pole and at least one antenna with at least one essentially closed loop, and where the antenna with at least one pole is loosely electromagnetically coupled with the antenna with at least one essentially closed loop.

11 Claims, 3 Drawing Sheets

COMMUNICATION STATION COMPRISING A CONFIGURATION OF LOOSELY COUPLED ANTENNAS

BACKGROUND OF THE INVENTION

1. Field of the Invention

The invention relates to a communication station for contactless communication with suitably designed data carriers, which communication station has an antenna configuration, in which the antenna configuration has at least one antenna with at least one pole and also at least one antenna with at least one essentially closed loop.

2. Related Arts

In connection with a communication station as described above reference can be made to patent document U.S. Pat. No. 5,572,226 A. This patent document states that in a communication station one dipole antenna or two dipole antennas and also one loop antenna can be provided. Here the antennas are provided and arranged with fields essentially independent of each other and the antennas can be operated in temporal succession in multiplex mode for detection purposes in order to find the most effective antenna in each case and in this way achieve the best possible communication in subsequent communication mode. In the known solution however in such a communication mode between the communication station and a data carrier connected to the communication station, always only one antenna is active so that the communication quality is dependent on the structure and relative position of the antenna with which the communication is performed. Because of this circumstance it may occur that the most effective antenna is selected and put into operation for communication mode, but because of given communication conditions, only an unsatisfactory or insufficiently satisfactory communication quality is achieved.

SUMMARY OF THE INVENTION

It is an object of the invention to avoid the above problems and achieve an improved communication station in relation to the state of the art.

To achieve the above object in a communication station according to the invention the features according to the invention are provided so that a communication station according to the invention can be characterized as follows, namely:

A communication station for contactless communication with suitably formed data carriers, which communication station has an antenna configuration, in which the antenna configuration has at least one antenna with at least one pole and in which the antenna configuration has at least one antenna with at least one essentially closed loop and in which an antenna with at least one loop is loosely coupled electromagnetically to an antenna with at least one pole.

By provision of the features according to the invention it is achieved that between an antenna with at least one loop and an antenna with at least one pole such an electromagnetic coupling predominates that firstly no unacceptably high and disruptive influence exists between these two antennas and the electrical circuits co-operating with these antennas and produced independently of each other, but that also because of the loose electromagnetic coupling a positive influence is exerted by the one of the two said antennas on the other of the two said antennas, with the result that viewed overall in relation to the state of the art in which no loose electromagnetic coupling exists between at least two antennas of an antenna configuration in communication mode because only one antenna is always active, clearly improved communication behavior is achieved. In a communication station according to the invention in which a carrier signal is used for communication—as has been known in itself for some time—advantageously only a relatively low carrier signal power is required, which is particularly favorable since no problems can occur with official disruptive radiation regulations as a result. Furthermore the advantage is achieved that because of the improved communication conditions, smaller communication coils can be used in the data carriers provided for communication with a communication station, which is advantageous with regard to miniaturization of such data carriers. In particular the measures according to the invention have proved advantageous if an antenna with at least one pole is used mainly as the transmitter antenna and an antenna with at least one loop, which is loosely coupled electromagnetically with the one-pole antenna, is used as the receiver antenna.

In a communication station according to the invention a loose electromagnetic coupling is possible in a relatively large coupling range, for example in a range between 0.01% and 50% to 60%. It has, however, proved advantageous if the electromagnetic loose coupling corresponds to a coupling factor k which is in a range between k=0.01% and k=30%. It has proved particularly advantageous here if the loose electromagnetic coupling corresponds to a coupling factor k which lies in the range from k=0.1% to k=5.0%. Under these conditions particularly good results were achieved in test studies.

In a communication station according to the invention, the antenna with at least one pole can be formed by a dipole antenna. It has, however, proved particularly advantageous if the antenna with at least one pole is formed by a monopole antenna. This is particularly advantageous because with the monopole antenna particularly favorable field patterns can be achieved in relation to the co-operaction with contactless communication data carriers.

In a communication station with a monopole antenna, the monopole antenna can be formed essentially L-shaped. It has however proved particularly advantageous if the monopole antenna is formed essentially U-shaped and has two leg sections and a web section connecting the two leg sections. Such a design, known in specialist circles as a rod antenna with roof capacitance, has proved particularly advantageous in view of particularly good communication properties, because with such a design a field pattern comparable to a curtain can be achieved, which guarantees reliable communication with data carriers moving through this curtain-like field pattern.

In a communication station with a U-shaped monopole antenna, the antenna with at least one essentially closed loop can be loosely electromagnetically coupled with the web section alone or with the web section and a leg section. It has however proved advantageous if the antenna with at least one essentially closed loop is loosely electromagnetically coupled with a leg section of the U-shaped monopole antenna. This is particularly advantageous in view of an exceptionally simple construction and in view of good reception properties for essentially vertically oriented data carriers, which occur often in practice for example when data carriers are carried by persons on their bodies.

The aspects described above and further aspects of the invention arise from the examples of embodiment described below and are explained using these examples of embodiment.

BRIEF DESCRIPTION OF THE DRAWINGS

The invention will be further described with reference to five examples of embodiment shown in the drawings, to which however the invention is not restricted.

DETAILED DESCRIPTION OF THE INVENTION

Figure 1:
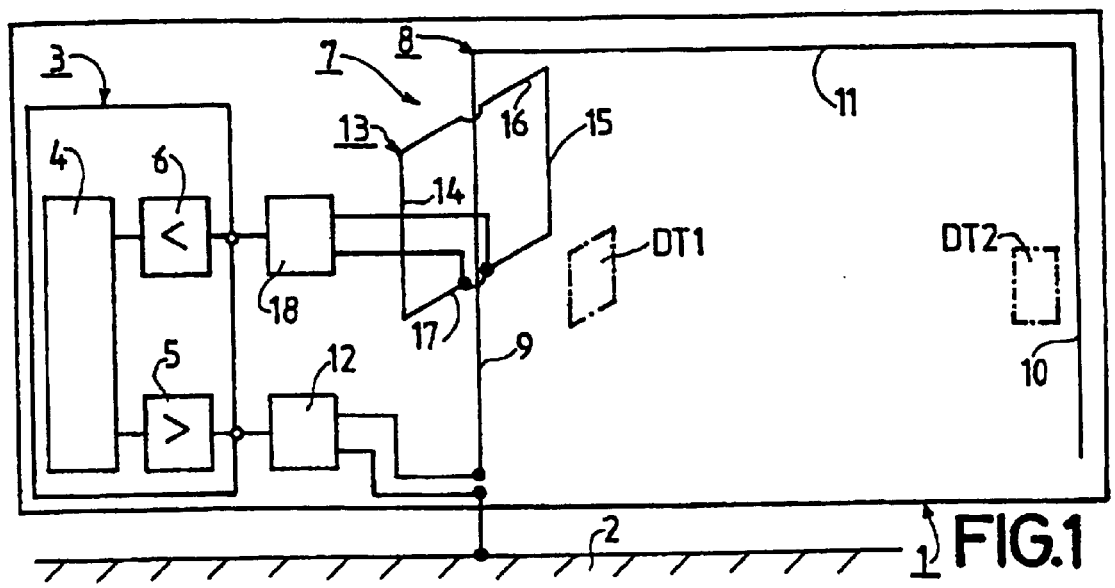
FIG. 1 shows diagrammatically and partly in the form of a block circuit diagram a communication station according to a first example of embodiment of the invention.

FIG. 1 shows a communication station 1. The communication station 1 is provided and designed for contactless communication with suitably formed data carriers. Two such data carriers DT1 and DT2 are shown diagrammatically in FIG. 1 in a dotted line. The two data carriers DT1 and DT2 can for example be data carriers, each of which is carried by a moving person or each of which is connected with a product carried by a person or a transport device, where then the data carriers DT1 and DT2 are provided for identification and where identification of the moved data carriers DT1 and DT2 is possible by means of communication station 1. Data carriers DT1 and DT2 are in the cases briefly described above moved away over the ground 2 shown diagrammatically in FIG. 1 which ground 2 constitutes electric earth. Earth may, however, also be constituted by a conveyor belt for luggage or a pillar of a chair lift or by any other electrically conductive body of relatively large surface.

The communication station 1 contains a transmitter/receiver circuit 3 which essentially contains a signal processing circuit 4 and a transmitter amplifier 5 and a receiver amplifier 6. The signal processing circuit 4 is provided and designed to generate and process signals to be transmitted by communication station 1 and process signals received by communication station 1. In this context it should be stated that the signal processing circuit 4 contains a carrier signal generator in known manner to generate a carrier signal. In the case of data transmission, the carrier signal is subjected to modulation via suitable means of signal processing circuit 4 in accordance with the data to be sent so that a modulated carrier signal is generated and supplied to the transmitter amplifier 5. In the case of data reception, the unmodulated carrier signal is supplied to the transmitter amplifier 5 where then the unmodulated carrier signal is emitted, which emitted unmodulated carrier signal, in the presence of a data carrier, is subject to modulation by means of the data carrier for example a load modulation where then a modulated carrier signal is produced with side band signal components, of which in the present case an upper side band signal component is utilized in which are contained the data to be received. Subsequently the modulated carrier signal and the side band signal components are supplied to the receiver amplifier 6 and subsequently the upper side band signal components filtered out and processed in the signal processing circuit 4. In the present case the unmodulated carrier signal has a frequency of 13.56 MHz. The upper side band signal component in this case has a frequency of around 14 MHz, namely 13.98 MHz because it is an upper side band. However a lower side band could also be utilized for data transfer purposes.

To emit and receive signals the communication station 1 has an antenna configuration 7. The antenna configuration 7 in the communication station according to FIG. 1 has a single-pole antenna 8 and in the present case mainly utilizes an electrical field for communication purposes, which is normally known as a monopole antenna 8. The monopole antenna 8 is here formed essentially U-shaped and has two leg sections 9 and 10 and a web section 11 connecting the two leg sections 9 and 10. In the area of the first leg section 9 the monopole antenna 8 is supplied via first adaptation means 12 connected to the transmitter amplifier 5. The first adaptation means 12 are provided to adapt the impedance. The first adaptation means 12 are tuned to a working frequency of 13.56 MHz i.e. the frequency of the carrier signal which can be generated by the signal processing circuit 4.

The antenna configuration 7 also contains an antenna 13 having in this case only one loop, normally known as a loop antenna. The loop antenna 13 is loosely electromagnetically coupled with the first leg section 9 of the monopole antenna 8. Here the loop antenna 13 has two loop sections 14 and 15 running essentially parallel with the first leg section 9 and two loop sections 16 and 17 running essentially transverse to the first leg section 9. In the area of the fourth loop section 17 the signals received via the loop antenna 13 are collected, where second adaptation means 18 are connected to the fourth loop section 17 and to which the receiver amplifier 6 is connected. The second adaptation means 18 are also provided to adapt the impedance. The second adaptation means 18 are tuned to a frequency of around 14 MHz i.e. to the above-mentioned side band signal component which contains the data to be received.

In the communication station 1 according to FIG. 1 the electromagnetically loose coupling between the monopole antenna 8 and the loop antenna 13 is implemented so that the electromagnetically loose coupling corresponds to a coupling factor k with a nominal value of around 1.0% which in practice corresponds to a coupling factor k in a range between k=0.1% and k=5.0% because of tolerances.

With regard to the monopole antenna 8 of communication station 1 according to FIG. 1 it should also be stated that in a practical implementation this monopole antenna 8 has a height of three (3) meters and a width of ten (10) meters. This means that the monopole antenna 8 can cover a very large surface area.

In the communication station 1 according to FIG. 1 the monopole antenna 8 is provided mainly for transmission purposes but indirectly it also fulfils a receiving function which will be discussed below. The loop antenna 13 is in this case intended only for receiving purposes.

If the data carrier DT1 is in the position shown in FIG. 1 or according to this position moves vertically to the drawing plane, then data are sent from the communication station 1 to the data carrier DT1 by means of the monopole antenna 8, in contrast to which data are sent from the data carrier DT1 to the communication station 1 and consequently data are received by the communication station 1 by means of the loop antenna 13 mainly utilizing a magnetic field for communication purposes, because there is a direct communication connection between the data carrier DT1 and the loop antenna 13, by which connection the monopole antenna 8 fulfils practically no additional receiving function. If, however, the data carrier DT2 is in the position shown in FIG. 1 or moves according to this position vertically to the drawing plane, data are sent from the communication station 1 to the data carrier DT2 in precisely the same way as described above for data carrier DT1, but the data are sent from data carrier DT2 to the communication station 1 not directly via the loop antenna 13 but in such a way that the data carrier DT2 co-operates directly with the monopole antenna 8 and then, because of the loose coupling between the monopole antenna 8 and the loop antenna 13, an over-coupling of the received signal takes place from the monopole antenna 8 to the loop antenna 13, so that in this case too the loop antenna 8 utilizing mainly an electromagnetic field for communication purposes serves to decouple the signal received with the monopole antenna 8. The reception power of the communication station 1 is clearly increased by the presence of the loop antenna 13.

Because no maximum strength coupling exists between the monopole antenna 8 and the loop antenna 13, but deliberately a loose electromagnetic coupling is provided, the advantage is obtained that the supporting effect of the loop antenna 13 in reception mode is utilized advantageously, but in this reception mode the monopole antenna 8—active here for emitting the unmodulated carrier signal—transfers to the loop antenna 13—active as a receiver antenna—only so little of the unmodulated carrier signal that in the received part of the signal processing circuit 4 of communication station 1 no undesirably high signal amplitude of the unmodulated carrier signal is caused.

Figure 2:
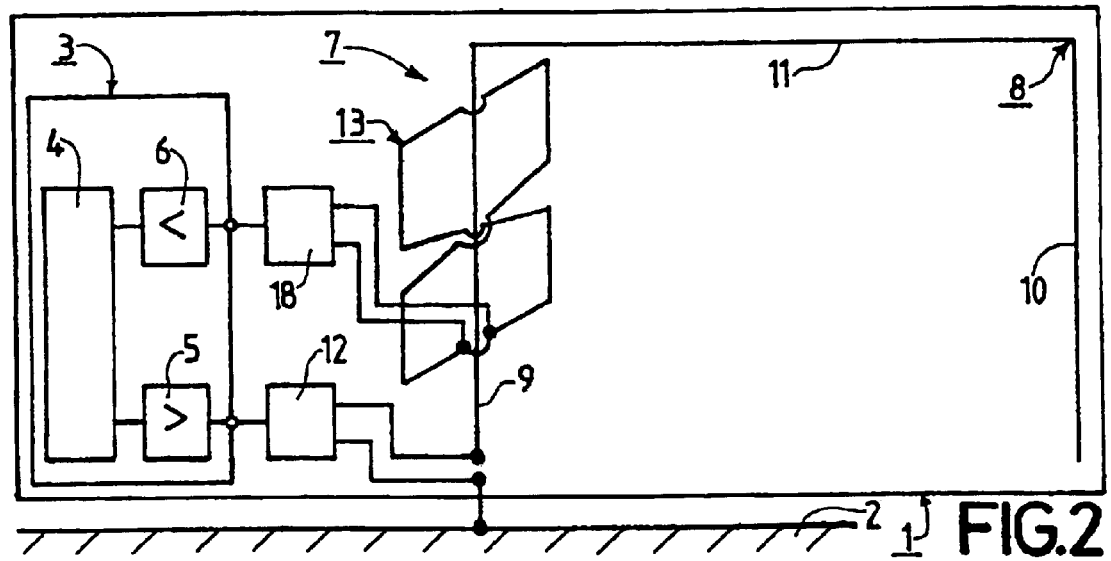
FIG. 2 shows in a similar manner to FIG. 1 a communication station according to a second example of embodiment of the invention.

In the communication station 1 according to FIG. 2 essentially the same structure exists as in the communication station 1 according to FIG. 1. A difference however exists in that namely in the communication station 1 according to FIG. 2 the loop antenna 13 is formed as an eight. This design has the advantage that the reception properties in relation to data carriers aligned parallel to the ground 2 or slightly angled to the ground 2 are particularly good.

Figure 3:
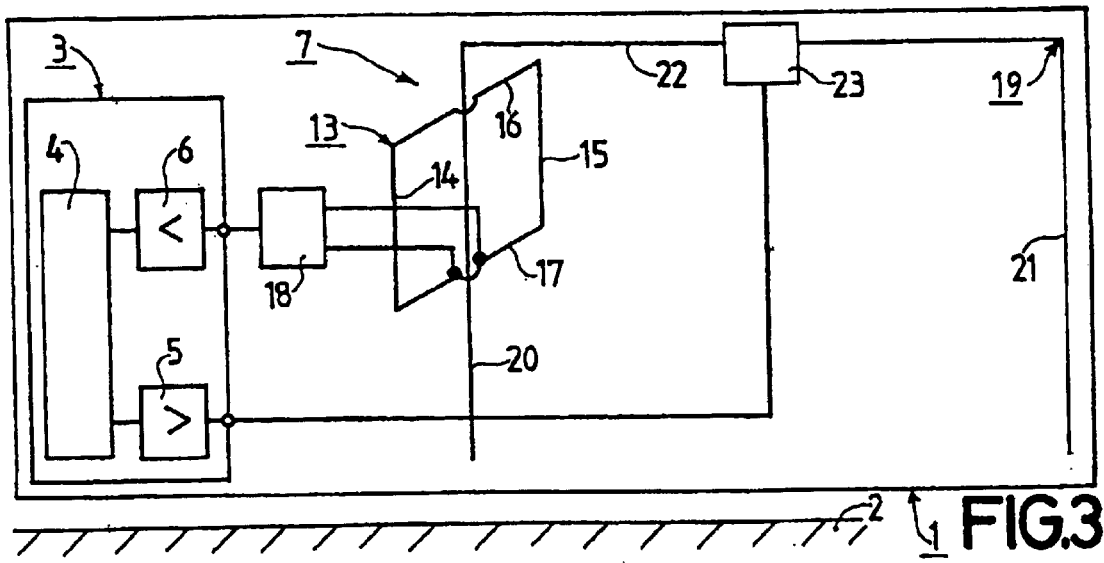
FIG. 3 shows in a similar manner to FIGS. 1 and 2 a communication station according to a third example of embodiment of the invention.

The further communication station 1 shown in FIG. 3 has a similar structure to the communication stations 1 according to FIGS. 1 and 2 with the difference that the antenna configuration 7 has, as an antenna with at least one pole which mainly utilizes an electric field for communication purposes, a dipole antenna 19 which is formed essentially U-shaped and which has a first leg section 20 and second leg section 21, which two leg sections 20 and 21 are connected via a web section 22, where in the web section 22 are provided adapter means 23 designed suitable for the dipole antenna 19.

Figure 4:
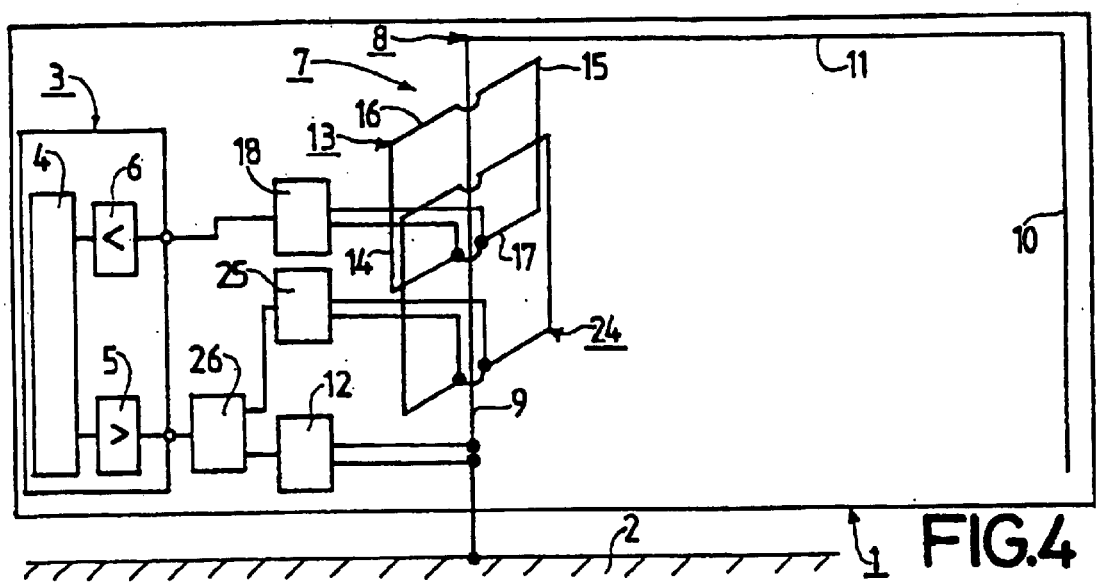
FIG. 4 shows in a similar manner to FIGS. 1, 2 and 3 a communication station according to a fourth example of embodiment of the invention.

In the communication station 1 according to FIG. 4 the antenna configuration 7—like the communication station 1 in FIG. 1—has a monopole antenna 8 and a loop antenna 13. In the communication station 1 according to FIG. 4 also a second loop antenna 24 is provided to which is connected third adaptation means 25. The second loop antenna 24 is here provided for transmission purposes. The monopole antenna 8 provided as a transmitter antenna and the second loop antenna 24 also provided as a transmitter antenna are supplied via the transmission amplifier 5, after which in this case is connected a splitter 26 to which in turn are connected the first adaptation means 12 and the third adaptation means 25.

In the communication station 1 according to FIG. 4 not only are the monopole antenna 8 and the loop antenna 13 electromagnetically loosely coupled but the monopole antenna 8 and the second loop antenna 24 are also electromagnetically loosely coupled. Furthermore the first loop antenna 13 and the second loop antenna 24 are also electromagnetically loosely coupled, which achieves that the upper transverse part of the second loop antenna 24 is arranged running essentially adjacent to the center area of the first loop antenna 8. The second loop antenna 24 can also be formed as an eight, which is favorable for achieving an electromagnetically loose coupling with the first loop antenna 8.

The splitter 26 can also contain phase-shift means with which a phase shift can be achieved between the currents supplied to the monopole antenna 8 and the second loop antenna 24, which is advantageous because in this way, constantly changing field distributions are obtained as a function of time, which guarantee reliable communication with data carriers irrespective of the spatial orientation or position of the data carriers.

The communication station 1 according to FIG. 4 offers the advantage that in a simple manner it is possible to achieve a multiplicity of field patterns and distributions and here structure the achievable field distributions advantageously.

Figure 5:
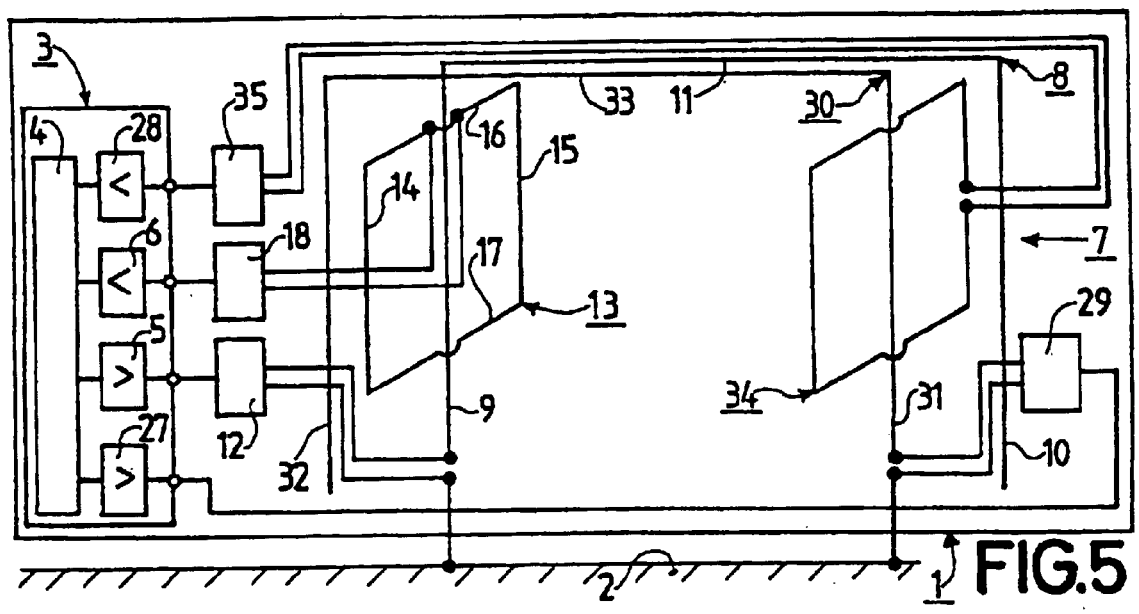
FIG. 5 shows in a similar manner to FIGS. 1, 2, 3 and 4 a communication station according to a fifth example of embodiment of the invention.

In the communication station 1 according to FIG. 5 the transmitter/receiver circuit 3 contains, in addition to the signal processing circuit 4 and transmitter amplifier 5 and receiver amplifier 6, a second transmitter amplifier 27 and a second receiver amplifier 28. Connected to the first transmitter amplifier 5 are again the first adaptation means 12 to which is connected the monopole antenna 8. Connected to the second transmitter amplifier 27 are further adaptation means 29 to which is connected a second monopole antenna 30 which has two leg sections 31 and 32 and a web section 33. The loop antenna 13 is again loosely coupled with the first monopole antenna 8, where connected to the loop antenna 13 are the second adaptation means 18, after which is connected the first receiver amplifier 6. In this case a second loop antenna 34 is electromagnetically loosely coupled to the second monopole antenna 30. The second loop antenna 34 is connected to further adaptation means 35 to which is connected the second receiver amplifier 28. The communication station 1 according to FIG. 5 offers the advantage that the two monopole antennas 8 and 30 can be supplied differently with regard to the phase positions of the signals supplied to them, for example anti-phase but also with phase positions different from 180°, whereby as a function of time, constantly changing field conditions are achieved, which allows communication irrespective of the relative position of a data carrier to the antenna configuration 7, and whereby with a phase shift of 180° advantageously a distant field cancellation is achieved.

It should be stated that in a communication station 1 according to the invention an antenna configuration 7 can be provided in which is provided at least one antenna with at least one pole for reception purposes and at least one antenna with at least one essentially closed loop for transmission purposes.

It should also be stated that also a higher number of antennas loosely coupled electromagnetically can be provided in a communication station 1 according to the invention than is the case in the communication stations 1 according to the examples of example of embodiment described above in FIGS. 1 to 5.

With reference to the choice of coupling factor k it is stated again that in the structure of communication stations 1 according to FIGS. 1 to 5 the coupling factor k is selected relatively small if primarily the data signals are to be received via the loop antenna, and, in contrast, the coupling factor k is selected relatively high if the antenna 8 or 19 with at least one pole is to make a greater contribution to the reception of data signals.

What is claimed is:

1. A communication station for contactless communication with suitably formed data carriers comprising: an antenna configuration including at least one antenna with at least one pole and at least one leg section, and at least one antenna with at least one essentially closed loop, wherein a first loop section of the closed loop runs essentially parallel with the leg section and a second loop section of the closed loop runs essentially transverse to the leg section, and wherein the at least one antenna with at least one loop is loosely coupled electromagnetically with the leg section of the at least one antenna with at least one pole wherein the electromagnetically loose coupling between the leg section and the antenna with at least one essentially closed loop corresponds to a coupling factor k in a range between k=0.01% and k=30%.

2. The communication station as claimed in claim 1 in which the electromagnetically loose coupling between the leg section and the antenna with at least one essentially closed loop corresponds to a coupling factor k in a range between k=0.1% and k=5.0%.

3. The communication station as claimed in claim 1 in which the antenna with at least one pole is formed by a monopole antenna.

4. The communication station as claimed in claim 3, in which the monopole antenna is formed essentially U-shaped and has two leg sections and a web section connecting the two leg sections.

5. The communication station as claimed in claim 4, in which the antenna with at least one essentially closed loop is electromagnetically loosely coupled with a leg section of the monopole antenna.

6. The communication station as claimed in claim 1, wherein the antenna with at least one essentially closed loop includes a first loop and a second loop formed essentially as a figure eight.

7. The communication station as claimed in claim 6, wherein the first loop is electromagnetically loosely coupled with the second loop.

8. A communication station for contactless communication with suitably formed data carriers comprising: an antenna configuration including a U-shaped monopole antenna with at least one leg section, and a loop antenna with at least one essentially closed loop, wherein a first loop section of the closed loop runs essentially parallel with the leg section and a second loop section runs essentially transverse to the leg section, and wherein the loop antenna is loosely coupled electromagnetically with the leg section of the monopole antenna wherein the electromagnetically loose coupling between the leg section and the antenna with at least one essentially closed loop corresponds to a coupling factor k in a range between k=0.01% and k=30%.

9. The communication station as claimed in claim 8, wherein the electromagnetically loose coupling between the leg section and the loop antenna corresponds to a coupling factor k in a range between k=0.1% and k=5.0%.

10. The communication station as claimed in claim 8, wherein the loop antenna includes a first loop and a second loop formed essentially as a figure eight.

11. The communication station as claimed in claim 10, wherein the first loop is electromagnetically loosely coupled with the second loop.

* * * * *